United States Patent [19]

Leupp et al.

[11] 3,978,580
[45] Sept. 7, 1976

[54] METHOD OF FABRICATING A LIQUID CRYSTAL DISPLAY

[75] Inventors: Alex M. Leupp, Newport Beach; Hans G. Dill, Costa Mesa, both of Calif.

[73] Assignee: Hughes Aircraft Company, Culver City, Calif.

[22] Filed: Sept. 27, 1974

[21] Appl. No.: 509,754

Related U.S. Application Data

[62] Division of Ser. No. 374,444, June 28, 1973, Pat. No. 3,863,332.

[52] U.S. Cl. .................................. 29/592; 29/591; 156/3; 156/7; 156/17; 427/90; 350/160 LC
[51] Int. Cl.² ........................................ H01L 21/302
[58] Field of Search ................ 156/17, 22, 3, 13; 117/217, 212, 8.5; 29/580, 590, 591, 578, 592; 427/90; 350/160 LC

[56] References Cited
UNITED STATES PATENTS

| | | | |
|---|---|---|---|
| 3,623,961 | 11/1971 | Van Laer | 156/8 |
| 3,679,941 | 7/1972 | LaCombe et al. | 156/3 |
| 3,769,108 | 10/1973 | Feldman et al. | 156/3 |
| 3,783,056 | 1/1974 | Keller et al. | 156/3 |
| 3,800,412 | 4/1974 | Wall et al. | 156/17 |
| 3,832,230 | 8/1974 | Terry | 156/3 |
| 3,909,930 | 10/1975 | Gurtler | 350/160 LC |
| 3,936,930 | 2/1976 | Stern | 29/592 |
| 3,938,242 | 2/1976 | Sussman | 29/576 R |
| 3,939,556 | 2/1976 | Borel et al. | 29/592 |

Primary Examiner—William A. Powell
Assistant Examiner—Jerome W. Massie
Attorney, Agent, or Firm—Joseph E. Szabo; W. H. MacAllister

[57] ABSTRACT

In forming the back panel of a liquid crystal display, layers of an insulating material and aluminum are successively deposited on the surface of a semiconducting substrate having an array of electrodes thereon. Openings are then formed through the insulating material and the aluminum layer to expose the electrodes, thereby defining a spacer lattice which is integral with the substrate and whose walls are of a uniform height which corresponds to the desired spacing between the front and back panels of the liquid crystal display.

3 Claims, 13 Drawing Figures

METHOD OF FABRICATING A LIQUID CRYSTAL DISPLAY

This is a division of application Ser. No. 374,444, filed June 28, 1973, now U.S. Pat. No. 3,863,332.

BACKGROUND OF THE INVENTION

The present invention relates generally to liquid crystal displays and more particularly to a method for fabricating the backplate for such displays having thereon spacers to maintain the thickness of the liquid crystal display uniform throughout.

In copending application Ser. No. 352,397 filed by Hans G. Dill et al. on Apr. 18, 1973, and entitled Liquid Crystal Display System with Integrated Signal Storage Circuitry, there is described a liquid crystal display panel having a plurality of spacers between the back and front panels of the liquid crystal display. The purpose of these spacers is to maintain a uniform spacing between the front and back panels of the liquid crystal display. One of the features of the invention described in the referenced application is the provision of addressing circuitry which is fabricated in the back panel of the display, which for this purpose is a semiconducting wafer.

It is a principal object of the present invention to provide a method for the fabrication of spacers of the type disclosed in the referenced patent application which method is compatible with the steps required to fabricate liquid display panels of the type therein described.

It is a related object of the invention to provide a method for the fabrication of back panels for liquid crystal displays with spacers which are accurately located with respect to an array of electrodes, also on the back panel.

A further object of the present invention is to provide a method for fabricating liquid crystal display back panels with integral spacers thereon wherein the spacers are resistant to attack by the liquid crystal material, and may serve to shield electrically conductors that run to the electrodes.

In accordance with the invention the above and other objects are accomplished by first forming an array of reflective electrodes in spaced apart columns and rows on a surface of a substrate panel which is preferably a semiconducting wafer. This step may be preceded by several steps directed to the formation of a plurality of switching devices in the surface of the semiconducting substrate as described in the referenced patent application. Following the formation of the reflective electrodes there is deposited a layer of insulating material, preferably oxide, on top of the substrate surface and over the electrodes, after which an additional layer, preferably of aluminum, is deposited over the layer of insulating material. A two-layered spacer lattice is formed from the successively deposited layers by removing those portions of the layers which are over the central portions of the electrodes. Preferably, so much of the layers is removed as to expose all but the extreme perimeters of the array of electrodes, thereby providing a slight overlap of the two-layered lattice over the electrodes. The resulting structure, comprising the back panel having a plurality of electrodes on its surface and a spacer lattice extending integrally from that surface, may then be used to complete the fabrication of a liquid crystal display by adding a front transparent panel having a transparent electrode thereon and placing a nematic liquid crystal material between the front and back panels. Further objects and features of the invention will become apparent from the following description and drawings in which:

Figure 1:
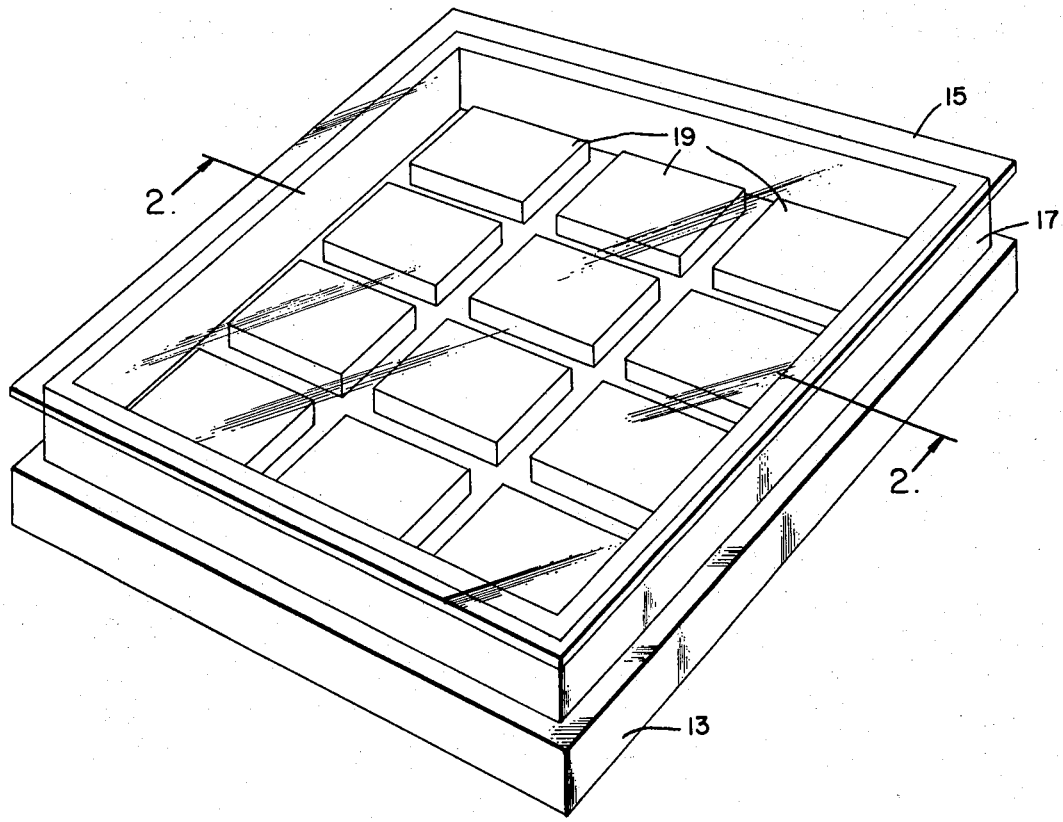
FIG. 1 is a perspective view of a liquid crystal display having a less desirable peripheral spacer between the front and back panels thereon.
Figure 2:
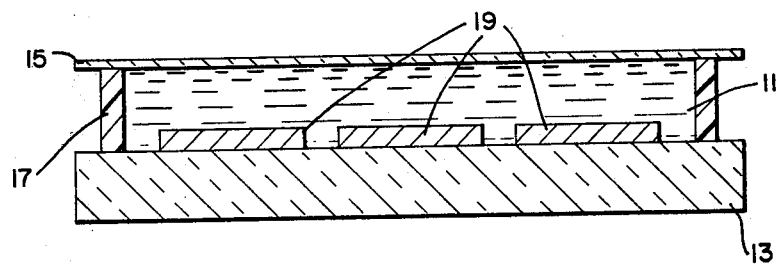
FIG. 2 is a cross section through the display illustrated in FIG. 1.

Referring now to the figures, a liquid crystal display of conventional construction is illustrated in FIGS. 1 and 2. A nematic liquid crystal material 11 is confined between back and front plates 13 and 15 by a peripherally extending spacer 17. An array of electrodes 19 is disposed on the surface of the backplate 13 and a transparent common electrode (not shown) is disposed on the inside surface of the transparent front plate 15. Desired images may be displayed by the selective actuation of desired ones of the array of electrodes 19 so as to establish an electric field between them and the front electrode across the liquid crystal material 11 lying between them. The particular theory of operation of liquid crystal displays is not of concern in this application but may be gleaned from the above referenced application which is hereby incorporated by reference.

It is an inherent disadvantage of the peripheral spacer 17 that it permits the bowing of the front electrode-carrying plate 15, thereby causing uneven electric fields to be applied across the width and length of the display. As a result, different field strengths will exist across the liquid crystal material when various ones of the back electrodes 19 are energized, causing uneven changes in the appearance of the liquid crystal material across the display.

Figure 3:
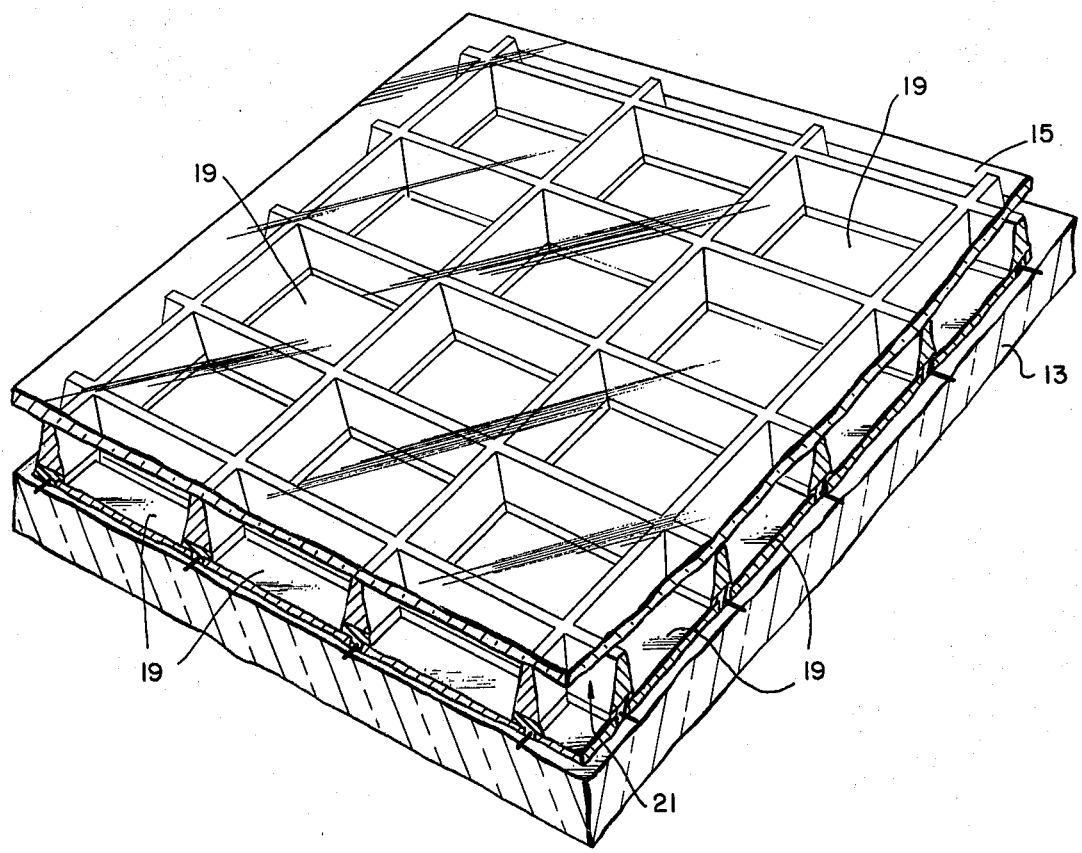
FIG. 3 is a diagrammatic perspective view of a liquid crystal display incorporating the spacer lattice configuration produced in accordance with the present invention.
Figure 4:
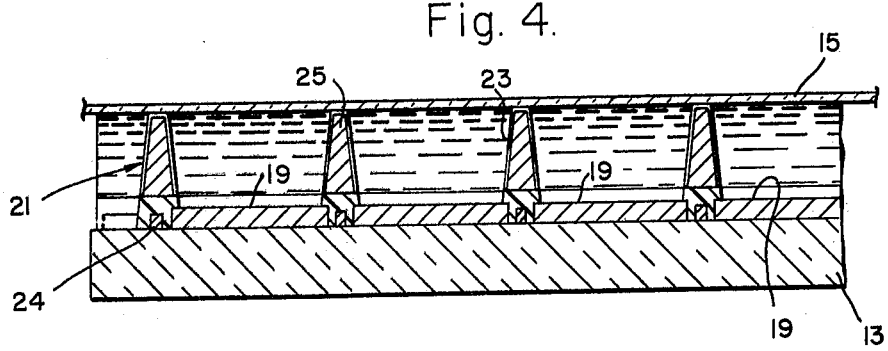
FIG. 4 is a cross section through the display illustrated in FIG. 3.

The above shortcomings are minimized by the provision of a spacer lattice in the liquid crystal display illustrated schematically in FIGS. 3 and 4. The latter liquid crystal display is shown with the same components as those illustrated in FIGS. 1 and 2 except that in place of the peripherally extending spacer 17 there is provided a lattice whose walls crisscross the surface of the back panel 13 between the individual electrodes 19. As best seen in FIG. 4, the individual walls of the spacer lattice 21 include a base 23 which rises above the surfaces of the electrodes 19 and a top portion 25 whose heights are uniform relative to the surface of the backplate 13. Preferably, the bases 23 are formed of an oxide layer which is particularly convenient to produce on top of the backplate 13 when that plate is made of silicon which is a preferable material for the backplate of the type disclosed in the above-referenced patent application. Because of the limitations which exist in the thickness to which such an oxide layer can be grown, it is preferable that the top portions of the walls of the lattice 21 be formed of a different material and aluminum which is already used in the process of fabricating the panel for forming the electrodes 19 is particularly suitable for this purpose.

Turning now to FIGS. 5–13, there will be next explained a method for fabricating the spacer lattice of FIGS. 3 and 4 in accordance with the present invention.

Figure 6:
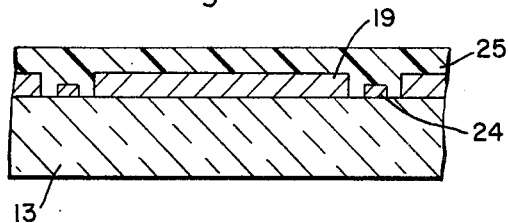
FIGS. 5–13 are a series of plan views and cross sections therethrough illustrating a back panel fabricated in accordance with the present invention at successive stages of such fabrication.
Figure 5:
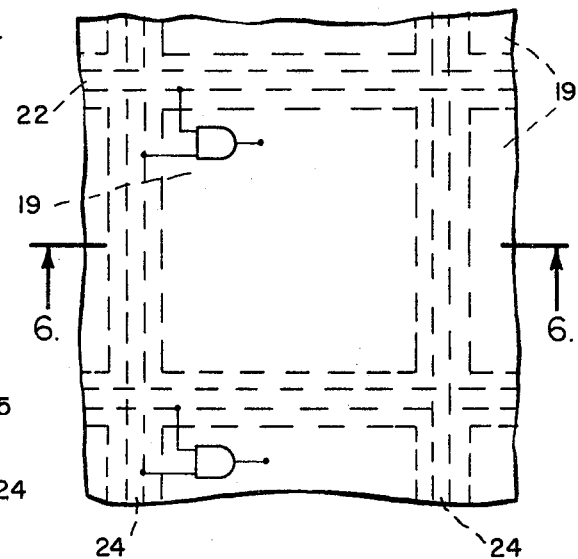
Figure 7:
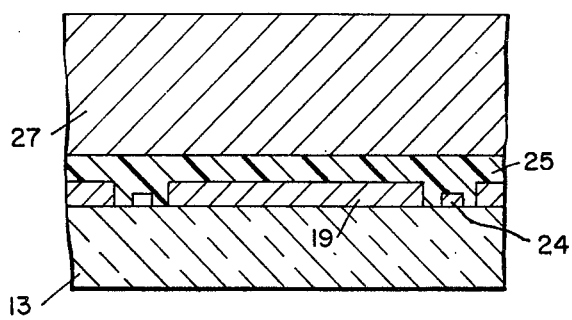
Figure 9:
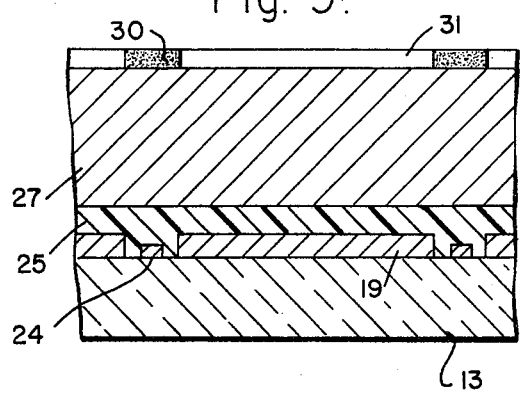
Figure 8:
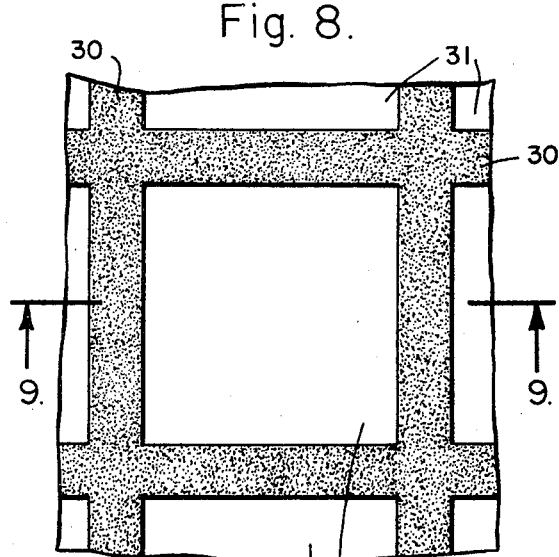
Figure 10:
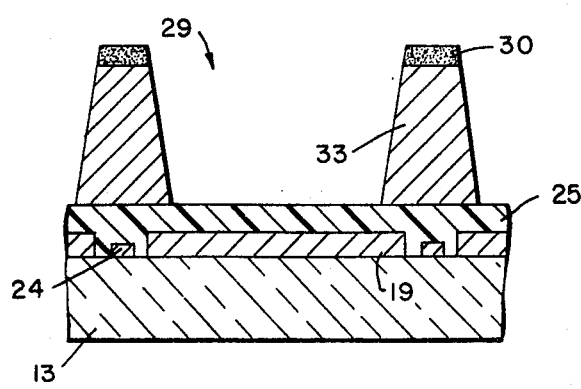
Figure 11:
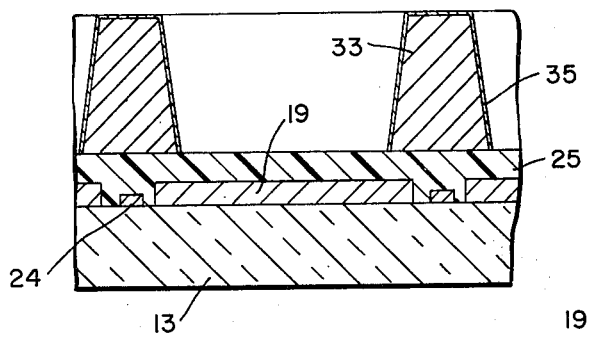
Figure 12:
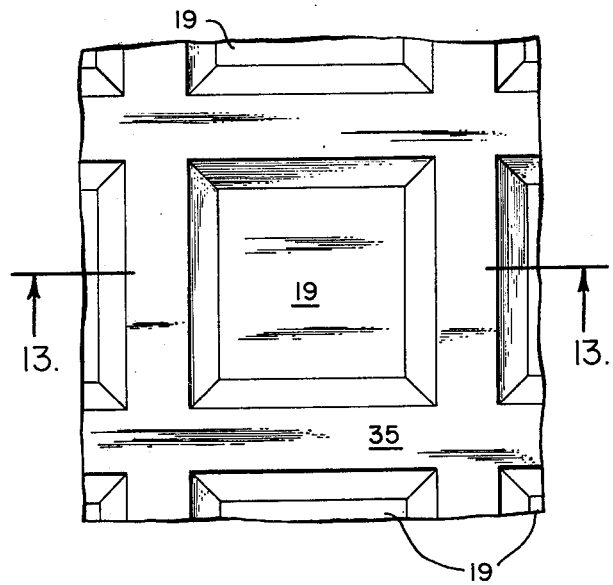
Figure 13:
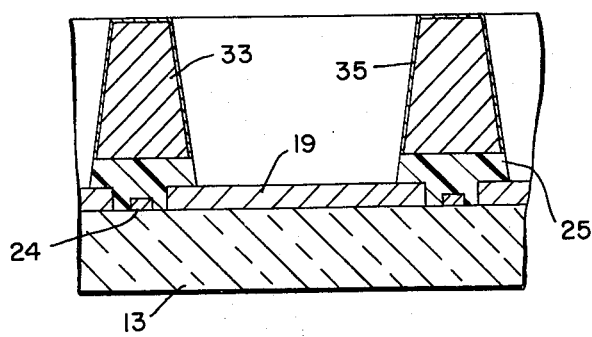

Prior to the fabrication of the spacer lattice, there is first formed on a suitable backplate 13 an array of electrodes 19. As described in the above-referenced patent application, the backplate 13 is preferably formed of a silicon substrate, typically in the form of a wafer about two inches in diameter. Alternatively, of course, the wafer may be square rather than circular in outline. In addition to forming an array of electrodes 19, arranged in columns and rows as shown in FIGS. 5 and 6, there are also formed on the backplate 13 X and Y buslines or conductors 22 and 24. The purpose of the respective X buslines 22 is to conditionally enable all of the electrodes 19 in a row associated with a particular busline. Similarly, it is the purpose of the respective Y buslines 24 to conditionally enable all of the electrodes 19 in a particular column associated with a particular Y busline. Thus, when a particular pair of X and Y buslines 22 and 24 is energized, this will cause a unique one of the electrodes 19 to be actuated. This is accomplished by providing a switching transistor for each electrode 19. Since each of the transistors functions as an AND gate, it is represented by the conventional symbol for such a gate in FIG. 5. The switching transistors 26 may be formed in the manner described in detail in the referred patent application in the body of the silicon backplate 13 and, since their fabrication is not a part of the present invention, it will not be described in detail herein. Briefly, however, the process described in the referenced patent application produces field effect transistors in the surface of the backplate 13, each of these transistors having a source connected to its associated electrode 19, a drain connected to one of the X and Y buslines 22 and 24, and a gate connected to the other one of the buslines 22 and 24. Thus, by energizing a particular pair of buslines 22 and 24, the necessary connections are made to the gate and drain of a particular transistor to complete a circuit through that transistor to the electrode 19 with which it is associated.

The transistors are shown only schematically in FIG. 5 and are not shown physically either in that Figure or in FIG. 6, which is a cross section therethrough. It will be understood, however, that the switching transistors are physically located in the surface of the backplate 13. Also disclosed in the referenced patent application is a technique for providing cross-under connections in the surface of the backplate 13 for either the X or the Y buslines 22 and 24. Thus, assuming that it is the X buslines 22 which are provided with such cross-under connections, a doped region is formed by conventional semiconductor doping techniques in the surface of the substrate 13 under those regions of the Y buslines 24 where they intersect the X buslines 22. Each of the X buslines 22 makes contact with the doped cross-under connection on both sides of the Y buslines to establish a continuous X bus conductor. Since the deposition of the aluminum conductors and electrodes 22, 24 and 19 are preceded by the formation of an oxide layer (not shown) in the process of forming the doped regions in the substrate which comprise the cross-under connectors, as well as the field effect transistors, the cross-under connections are prevented from directly connecting the X conductors 22 to the Y conductors 24. Contact between the X conductors 22 and their respective doped cross-under connections is established by etching through the oxide layer above these doped cross-under connections so that when the metal layers, including the bus conductors 22 are formed, they extend down to the cross-under connectors to establish contact with them.

Returning now to the description of the present invention, after the formation of the display electrodes 19 and their associated buslines 22 and 24, an insulating layer 25 is deposited over the surface of the substrate 13 so as to cover both the surface and the electrodes 19. Preferably the insulating layer is a silicon dioxide film doped with phosphorus to effect a more uniform deposition. A thickness of 1.5 microns can be readily achieved in a horizontal resistance heated furnace at 450°C, maintained for 30 minutes. The doped silicon dioxide layer is formed in the furnace by the decomposition of the SiH4 and doping of the oxide can be achieved by adding phosphine gas. Other means of depositing the insulating layer, such as sputtering and evaporating, may also be employed.

There is next evaporated a layer of aluminum 27 on top of the doped oxide layer 25. As will become apparent shortly, it is the total thickness of the two layers 25 and 27 which ultimately determines the total thickness of the liquid crystal display device in which the fabricated assembly will be incorporated. The optimum cell thickness and therefore the optimum spacing between the back electrodes 19 and the electrode carried by the front plate 15 depends on the particular application for which the display device is to be used. One of the advantages of the present invention is that whatever is the desired thickness it can be readily achieved by varying the thickness of the aluminum layer 27, since the evaporation process can be controlled within the required tolerances without difficulty. Since front to back spacing of 6 to 10 microns is typical, the usual thickness of the aluminum layer will be about 4 to 8 microns, which with the 1.5 micron oxide layer 25 results in a total spacer height of 5.5 to 9.5 microns. In comparison a typical spacing between adjacent walls of the spacer will be about 10 mils, or about 25 times the height of the spacer walls.

Windows 29 are next opened to the reflective back electrodes 19. For this purpose, a photoresist layer is applied on top of the aluminum layer 27 and a suitable pattern in the photoresist layer is exposed after which the photoresist is developed, the exposed portions are removed, thereby exposing through openings 31 in the photoresist layer portions of the aluminum layer 27 corresponding to the windows 29 which are to be formed therethrough. The masked aluminum layer 27 is then exposed to an aluminum etchant which removes the exposed portions of the aluminum layer down to the bottom oxide layer 25.

Next the remainder of the photoresist mask is removed and the remaining aluminum pattern 33 is anodized so as to minimize any possible subsequent interaction between the aluminum pattern 33 and the liquid crystal material with which it will interface. Anodization is suitably performed electrolytically in a solution of tartaric acid (concentration 3% Ph adjusted to 5.5). Application of 150 volts between the aluminum structure 33 and a negative electrode, both submerged in the tartaric acid solution, will result in an anodized layer of 2100 angstroms.

Finally, using the anodized aluminum layer 35 as a mask, the exposed portions of the underlying oxide layer 25 are etched away in a solution off buffered hydrofluoric acid. This etchant will expose the central portion of each of the electrodes 19. In other words, the spacer lattice at its base overlaps the edges of the electrodes 19.

This completes the fabrication of the backplate and its integrated spacer lattice. Liquid crystal material may now be placed on the backplate in the interstices of the spacer lattice, after which the top plate 15 is secured in place.

What has been described is a preferred method for fabricating an integrated spacer lattice for the backplate of a liquid crystal cell. Modifications of the invention will readily occur to those skilled in the art having the benefit of the above description. For example, other materials may be used in place of those given above for the two layers 25 and 27. Moreover, a single layer of an insulating material which can be grown to satisfy the height requirements for the spacer lattice can be used. Such a material might, for example, be polycrystalline silicon. Moreover, whereas there have been shown an array of electrodes arranged on the backplate of a liquid crystal cell in columns and rows, it is apparent that the method of the present invention for fabricating a spacer lattice structure for such a backplate could be employed with equal benefits with a different arrangement of such electrodes. Generally, it will be true that such a spacer lattice and method disclosed therefor will be found useful wherever there are a plurality of electrodes spaced from one another on the backplate of the liquid crystal cell regardless of the geometrical configuration into which its distribution may fall.

What is claimed is:

1. A method of fabricating a liquid crystal display having a backplate with electrodes and integrated spacers comprising the steps of:
   a. forming an array of reflective electrodes in spaced apart columns and rows on a surface on a substrate,
   b. forming a coating on said surface and over said electrodes by the steps which include,
      i. depositing an insulating layer on said substrate surface and extending over said electrodes, and
      ii. depositing a second layer over said first layer,
   c. forming a lattice of said coating, comprised of spaced apart walls of uniform height extending at their bases over the edges of said electrodes, by removing those portions of said coating which overlie said electrodes out to, but not including, said edges, said lattice having a plurality of interstices aligned with said electrodes,
   d. placing liquid crystal material into said interstices so as to cover said electrodes, and
   e. securing a transparent front plate to said lattice, whereby said lattice maintains uniform spacing between said backplate and said front plate.

2. The method of claim 1 characterized further in that said insulating layer is a doped oxide and said second layer is aluminum.

3. A method of fabricating a liquid crystal display having a backplate with electrodes and integrated spacers comprising the steps of:
   a. forming a plurality of electrodes on a surface of a substrate,
   b. forming a layer on said substrate and over said electrodes, at least the base of said layer being an insulating material, and
   c. converting said layer into a plurality of spaced apart walls of equal height extending at their bases over the edges of said electrodes by removing those portions of said layer which overlie said electrodes out to, but not including, said edges, said walls defining a plurality of interstices aligned with said electrodes,
   d. placing liquid crystal material into said interstices so as to cover said electrodes, and
   e. securing a transparent front plate to said spaced apart walls, whereby said walls maintain uniform spacing between said backplate and said front plate.

* * * * *